US006316089B1

(12) United States Patent
Ohtani et al.

(10) Patent No.: US 6,316,089 B1
(45) Date of Patent: Nov. 13, 2001

(54) PHOTOCURABLE PREPREG SHEET FOR WATERPROOFING, METHOD AND APPARATUS FOR PRODUCTION OF PREPREG SHEET, AND WATERPROOFING METHOD USING THE SHEET

(75) Inventors: Kazuo Ohtani; Tomio Yamamoto, both of Saitama; Hidetake Sendai, Kanagawa; Toshihiko Kadota, Gunma; Shuichi Sugita, Tokyo; Hirotoshi Kamata; Takeo Watanabe, both of Chiba, all of (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 09/205,227

(22) Filed: Dec. 4, 1998

Related U.S. Application Data

(60) Provisional application No. 60/074,615, filed on Feb. 13, 1998.

(30) Foreign Application Priority Data

Dec. 5, 1997 (JP) .................................................... 9-352148

(51) Int. Cl.[7] ............................ C08F 290/06; B05D 7/00; B05D 7/24
(52) U.S. Cl. ...................... 428/300.7; 428/35.9; 428/113; 428/298.1; 522/4; 522/6; 264/257; 264/266; 264/279; 264/294; 264/478; 264/135; 264/136
(58) Field of Search .................................... 264/478, 135, 264/136, 257, 266, 275, 294; 522/4, 6; 428/298.1, 35.9, 113, 300.7

(56) References Cited

U.S. PATENT DOCUMENTS 5,217,654 * 6/1993 Buckley .

FOREIGN PATENT DOCUMENTS 197 09 765
A1    12/1997 (DE) .

(List continued on next page.)

Primary Examiner—Richard Weisberger
(74) Attorney, Agent, or Firm—Sughrue, Mion, Zinn, Macpeak & Seas, PLLC

(57) ABSTRACT

A photocurable prepreg sheet for waterproofing includes (1) a fiber-reinforced resin layer which comprises a sheet-shaped inorganic or organic fibrous reinforcing material impregnated with a resin composition comprising:
   (A) an unsaturated polyester resin and/or vinyl ester resin:
       100 parts by weight, and
   (B) at least two photopolymerization initiators having photosensitivity in different wavelength ranges from ultraviolet range to near infrared range:
       0.01 to 10 parts by weight,
and which is treated with light of a specific wavelength to thereby undergo prepolymerization which causes at least one of the polymerization initiators and radical-polymerizable unsaturated groups to remain partially intact; and (2) film which covers an upper surface and a back surface of the fiber-reinforced resin layer. The waterproofing material does not require resin impregnation work, can be installed within a short time with successful resin setting, is free form the risk and cumbersome procedure which are caused when a peroxide catalyst is directly handled, and permits adjustment of the pot life. Also disclosed are method and apparatus for production of the prepreg sheet, and waterproofing method using the sheet.

8 Claims, 2 Drawing Sheets

FOREIGN PATENT DOCUMENTS

| | | | |
|---|---|---|---|
| 0 097 012 A1 | 12/1983 | (EP) | . |
| 0 438 123 A2 | 7/1991 | (EP) | . |
| 0 554 236 A1 | 8/1993 | (EP) | . |
| 0438123A2 | 1/1991 | (EP) | C08F/2/46 |
| 45-37377 | 11/1970 | (JP) | . |
| 1-96079 | 4/1989 | (JP) | C04B/41/71 |
| 4-261405 | 9/1992 | (JP) | C08F/2/46 |
| 4-261406 | 9/1992 | (JP) | C08F/2/46 |
| 3-111402 | 5/1991 | (JP) | C08F/2/50 |
| 3-179003 | 8/1991 | (JP) | C08F/2/50 |
| 4-146905 | 5/1992 | (JP) | C08F/2/50 |
| 8-319328 | 12/1996 | (JP) | C08F/290/06 |
| 4-142323 | 5/1992 | (JP) | C08F/299/04 |
| 4-253717 | 9/1992 | (JP) | C08F/299/04 |
| 1-201362 | 8/1989 | (JP) | C08L/67/06 |
| 8-311805 | 11/1996 | (JP) | E01C/3/06 |
| 5-295862 | 11/1993 | (JP) | E04D/7/00 |

\* cited by examiner

PHOTOCURABLE PREPREG SHEET FOR WATERPROOFING, METHOD AND APPARATUS FOR PRODUCTION OF PREPREG SHEET, AND WATERPROOFING METHOD USING THE SHEET

This application claims benefit of the provisional application No. 60/074,615 filed Feb. 13, 1998.

FIELD OF THE INVENTION

The present invention relates to a prepreg sheet for waterproofing which is used for structures in the fields of civil engineering and construction, a method for producing the prepreg sheet, and to a waterproofing method. More specifically, the present invention relates to a photocurable prepreg sheet for waterproofing that enables FRP-waterproofing to be performed in a short period of time with significantly reduced offensive smell of monomers etc. generated from photo-curing reactions by use of a photocurable prepreg sheet for waterproofing; a method for producing the prepreg sheet, an apparatus for producing the prepreg sheet continuously; and a waterproofing method using the prepreg sheet.

BACKGROUND OF THE INVENTION

Properties required of a waterproofing material used as a coating material for waterproofing the surface of concrete, mortar, or the like used in constructions such as roofs, verandas, parking lots, corridors, and swimming pools include resistance against vibrations of buildings and impact caused by fallen objects, capability of sealing the surface of a crack formed in the concrete or mortar beneath the coat, alkali-resistance, and high adhesion to the substrate.

Conventionally, asphalt and urethane resins have been used as waterproof lining materials for concrete and mortar but have been unsatisfactory. Recently, there has often been employed the FRP method, in which unsaturated polyester resin or vinyl ester resin which are endowed with pliability is combined with a fibrous reinforcing material.

Thermosetting resins used in the FRP method have been studied energetically in recent years, and there have been proposed various types of thermosetting resins such as those which are endowed with both flexibility and chemical resistance, those which exhibit a large % elongation at low temperature, and those which are endowed with air drying property, as described in Japanese Patent Application Laid-Open (kokai) Nos. 8-319328, 1-201362, 8-311805, 5-295862, 1-96079, 4-253717, and 4-142323.

When lining is performed by use of unsaturated polyester resin or vinyl ester resin, room temperature setting by use of a peroxide serving as a catalyst is normally employed. However, the room temperature setting has a drawback that it requires a step for impregnating a fibrous reinforcing material layer with a resin. Also, a long period of time is required before the resin is completely set, which leads to both decrease in working efficiency and volatilization of reactive monomers such as styrene monomers, resulting in a deteriorated resin performance due to a change in the ratio of the resin compositions, loss of resin in amount, and air pollution at the work site. Moreover, there are required intricate procedures such as measuring a peroxide serving as a catalyst with a dropping pipet and mixing it with resin at the working site. In addition, since gelation time of resin itself varies significantly with temperature, adjustment of the amount of a catalyst to be used is difficult, and failure in adjustment leads to unsuccessful adjustment of pot life of the resin.

As one means to solve these drawbacks, volatile monomers, such as styrene, contained in the resin are replaced by high-boiling-point compounds, to thereby manage the problems of air pollution and odor in the workplace. However, there remain unsolved such drawbacks involved in the system in which a peroxide catalyst is used in combination with an ambient-temperature-setting resin as in the case of unsaturated polyester resin or vinyl ester resin, which requires a long period of time for the resin to be set. Also remaining are problems that use of a peroxide as a catalyst might be hazardous, that complicated procedures are required for the addition of the peroxide as a catalyst, and that the adjustment of pot life of the resin is difficult.

There may be suggested use of a prepreg sheet that has been obtained by B-staging (prepregnating) glass fiber or similar material impregnated with an unsaturated polyester resin or a vinyl ester resin so as to achieve a hardness that allows easy handling. In this connection, room temperature setting type prepreg sheets is not usable because they can be stored for only a short period. With regard to photocurable prepreg sheets, conventional methods for prepregnating thermosetting resins—or example, metal thickening of unsaturated polyester resin by use of magnesium oxide and isocyanate thickening of vinyl ester resin—are unable to keep photocurable stable prepreg sheets. In addition, there are drawbacks that, since a reactive diluent such as a styrene monomar contained in the resin does not participate in the thickening reaction of vinyl ester resin or that of unsaturated polyester resin, resin volatilizes or escapes from the fibrous substrate during storage of the prepreg sheet.

In a conventional wet FRP-waterproofing method, a buffer layer comprised of a soft resin alone is often formed beneath the FRP lining layer so that the lining layer can seal the surface of a crack formed in the concrete. However, conventional metal thickening by use of magnesium oxide and isocyanate thickening require a long time before completion of reaction, with the result that the buffer layer and the fiber-reinforced layer are intermixed, leading to difficulty in forming a definite buffer layer. Thus, manufacture of photocurable prepreg sheets applicable to an FRP lining layer having a buffer layer thereon has been difficult.

SUMMARY OF THE INVENTION

In view of the foregoing, an object of the present invention is to provide a waterproofing material which does not require a process of impregnating a fibrous reinforcing material with a resin at the work site, which permits installation work and setting of resin to be completed within a short period of time, and which solves drawbacks such as the risk of explosion involved in direct handling of a peroxide catalyst, intricate procedures required for the addition of the peroxide catalyst, and difficulty in the adjustment of pot life of the resin. Other objects of the present invention include provision of a manufacturing method of the waterproofing material; a waterproof-coating method, making use of the waterproofing material; a photocurable prepreg sheet which serves as a waterproofing material and which is used for an FRP lining layer having a buffer layer; a method for manufacturing the prepreg sheet; and waterproof-coating method making use of the prepreg sheet.

Accordingly, the present invention provides a photocurable prepreg sheet, a method or process for producing a photocurable prepreg sheet, an apparatus usable for producing a photocurable prepreg sheet, and a waterproofing method using a photocurable prepreg sheet as described below.

[1] photocurable prepreg sheet for waterproofing comprising:
(1) a fiber-reinforced resin layer which comprises a sheet-shaped inorganic or organic fibrous reinforcing material impregnated with a resin composition comprising:
(A) an unsaturated polyester resin and/or vinyl ester resin:
100 parts by weight, and
(B) at least two photopolymerization initiators having photosensitivity in different wavelength ranges from ultraviolet range to near infrared range:
0.01 to 10 parts by weight,
and which is treated with light of a specific wavelength to thereby undergo prepolymerization which causes at least one of the photopolymerization initiators and radical-polymerizable unsaturated groups to remain partially intact; and
(2) film which covers an upper surface and a back surface of the fiber-reinforced resin layer.

[2] A photocurable prepreg sheet for waterproofing according to [1], wherein one of the photopolymerization initiators having photosensitivity from ultraviolet range to near infrared range comprises a combination of a cationic dye and a sensitizer; the cationic dye having photosensitivity from visible light range to near infrared range and being represented by formula (1):

$$D^{+}\cdot A^{-} \quad (1)$$

wherein $D^+$ represents a dye cation having photosensitivity from visible light range to near infrared range and derived from methine, polymethine, xanthene, oxazine, thiazine, arylmethane, or pyrylium, and $A^-$ represents an anion; and the sensitizer being represented by formula (2):

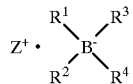

$$(2)$$

wherein $Z^+$ represents an arbitrary cation; each of $R^1, R^2, R^3$, and $R^4$ independently represents an alkyl group, an aryl group, an aralkyl group, an alkenyl group, an alkynyl group, a silyl group, a heterocyclic group, or a halogen atom.

[3] A photocurable prepreg sheet for waterproofing according to [1], wherein one of the polymerization initiators having photosensitivity from ultraviolet range to near infrared range is a combination of a hexaarylbiimidazole compound having photosensitivity from ultraviolet range to visible light range and a hydrogen-donating compound, or an acylphosphine oxide compound.

[4] A photocurable prepreg sheet for waterproofing according to [1], wherein the sheet-shaped inorganic or organic fibrous reinforcing material is selected from among a glass-made or organic-fiber-made mat, cloth, and non-woven fabric.

[5] A photocurable prepreg sheet for waterproofing comprising:
(1) a precured resin layer which comprises a resin composition of a predetermined thickness comprising:
(A) an unsaturated polyester resin and/or vinyl ester resin:
100 parts by weight, and
(B) at least two photopolymerization initiators having photosensitivity in different wavelength ranges from ultraviolet range to near infrared range:
0.01 to 10 parts by weight,
and which is treated with light of a specific wavelength so as to cause at least one of the photopolymerization initiators and radical-polymerizable unsaturated groups to remain partially intact;
(2) a fiber-reinforced resin layer which comprises a sheet-shaped inorganic or organic fibrous reinforcing material impregnated with a resin composition comprising the aforementioned components (A) and (B), and which is treated with light of a specific wavelength to thereby undergo prepolymerization which causes at least one of the photopolymerization initiators and radical-polymerizable unsaturated groups to remain partially intact; and
(3) film which covers an upper surface and a back surface of the fiber-reinforced resin layer and the resin layer.

[6] A photocurable prepreg sheet for waterproofing according to [5], wherein one of the photopolymerization initiators having photosensitivity from ultraviolet range to near infrared range comprises a combination of a cationic dye and a sensitizer; the cationic dye having photosensitivity from visible light range to near infrared range and being represented by formula (1):

$$D^{+}\cdot A^{-} \quad (1)$$

wherein $D^+$ represents a dye cation having photosensitivity from visible light range to near infrared range and derived from methine, polymethine, xanthene, oxazine, thiazine, arylmethane, or pyrylium, and $A^-$ represents an anion; and the sensitizer being represented by formula (2):

$$(2)$$

wherein $Z^+$ represents an arbitrary cation; each of $R^1, R^2, R^3$, and $R^4$ independently represents an alkyl group, an aryl group, an aralkyl group, an alkenyl group, an alkynyl group, a silyl group, a heterocyclic group, or a halogen atom.

[7] A photocurable prepreg sheet for waterproofing according to [5], wherein one of the polymerization initiators having photosensitivity from ultraviolet range to near infrared range is a combination of a hexaarylbiimidazole compound having photosensitivity from ultraviolet range to visible light range and a hydrogen-donating compound, or an acylphosphine oxide compound.

[8] A photocurable prepreg sheet for waterproofing according to [5], wherein the sheet-shaped inorganic or organic fibrous reinforcing material is selected from among a glass-made or organic-fiber-made mat, cloth, and non-woven fabric.

[9] A method for producing a photocurable prepreg sheet for waterproofing comprising the steps of:
impregnating a sheet-shaped inorganic or organic fibrous reinforcing material placed on a film with a resin composition comprising:
(A) an unsaturated polyester resin and/or vinyl ester resin:
100 parts by weight, and
(B) at least two photopolymerization initiators having photosensitivity in different wavelength ranges from ultraviolet range to near infrared range:
0.01 to 10 parts by weight;
film-coating the upper surface of the impregnated fibrous reinforcing material; and treating the film-coated material with light of a specific wavelength to thereby effect prepolymerization so as to cause at least one of the photopolymerization initiators and radical-polymerizable unsaturated groups to remain partially intact.

[10] A method for continuously producing a photocurable prepreg sheet according to [9], wherein after final prepolymerization in which radical-polymerizable unsaturated groups contained in the resin composition are partially prepolymerized through treatment with light of a specific wavelength which permits at least one of the photopolymerization initiators and radical-polymerizable unsaturated groups to remain partially intact in the photocurable prepreg sheet having a film-coated resin layer, the resultant sheet is wound in a roll or folded up in the accordion-pleat shape.

[11] A method for producing a photocurable prepreg sheet according to [9], wherein the wavelength of the light used in prepolymerization is 500 nm or more.

[12] A method for producing a photocurable prepreg sheet for waterproofing comprising the steps of:

coating a film with a resin composition comprising:
(A) an unsaturated polyester resin and/or vinyl ester resin:
100 parts by weight, and
(B) at least two photopolymerization initiators having photosensitivity in different wavelength ranges from ultraviolet range to near infrared range:
0.01 to 10 parts by weight to a predetermined thickness;

treating the resultant film with light of a specific wavelength which permits at least one of the photopolymerization initiators and radical-polymerizable unsaturated groups to remain partially intact so as to form a resin layer which has been partially prepolymerized;

placing a sheet-shaped inorganic or organic fibrous reinforcing material on the resin layer;

impregnating the fibrous reinforcing material with the resin composition comprising the components (A) and (B);

film-coating the upper surface of the resin-impregnated fibrous reinforcing material; and subsequently treating the resultant material with light of a specific wavelength so as to effect prepolymerization to cause at least one of the photopolymerization initiators and radical-polymerizable unsaturated groups to remain partially intact, to thereby form a fiber-reinforced resin layer.

[13] A method for continuously producing a photocurable prepreg sheet according to [12], wherein after final prepolymerization in which radical-polymerizable unsaturated groups contained in the resin composition are partially prepolymerized through treatment with light of a specific wavelength which permits at least one of the photopolymerization initiators and radical-polymerizable unsaturated groups to remain partially intact in the photocurable prepreg sheet having a film-coated resin layer, the resultant sheet is wound in a roll or folded up in the accordion-pleat shape.

[14] A method for producing a photocurable prepreg sheet according to [12], wherein the wavelength of the light used in prepolymerization is 500 nm or more.

[15] A method for producing a photocurable prepreg sheet for waterproofing comprising the steps of:

impregnating a sheet-shaped inorganic or organic fibrous reinforcing material placed on a film with a resin composition comprising:
(A) an unsaturated polyester resin and/or vinyl ester resin:
100 parts by weight, and
(B) at least two photopolymerization initiators having photosensitivity in different wavelength ranges from ultraviolet range to near infrared range:
0.01 to 10 parts by weight;

treating the resultant impregnated material with light of a specific wavelength which permits at least one of the photopolymerization initiators and radical-polymerizable unsaturated groups to remain partially intact, to thereby form a fiber-reinforced resin layer which has been partially prepolymerized;

coating the layer with a resin composition formed of the components (A) and (B) to a predetermined thickness;

film-coating the resultant resin-coated layer; and subsequently treating the resultant material with light of a specific wavelength so as to form a prepolymerized resin layer in which at least one of the photopolymerization initiators and radical-polymerizable unsaturated groups remain partially intact.

[16] A method for continuously producing a photocurable prepreg sheet according to [15], wherein after final prepolymerization in which radical-polymerizable unsaturated groups contained in the resin composition are partially prepolymerized through treatment with light of a specific wavelength which permits at least one of the photopolymerization initiators and radical-polymerizable unsaturated groups to remain partially intact in the photocurable prepreg sheet having a film-coated resin layer, the resultant sheet is wound in a roll or folded up in the accordion-pleat shape.

[17] A method for producing a photocurable prepreg sheet according to [15], wherein the wavelength of the light used in prepolymerization is 500 nm or more.

[18] An apparatus for production of photocurable prepreg sheet, comprising:

means for impregnating a sheet-shaped inorganic or organic fibrous reinforcing material with a resin composition comprising:
(A) an unsaturated polyester resin and/or vinyl ester resin:
100 parts by weight, and
(B) at least two photopolymerization initiators having photosensitivity in different wavelength ranges from ultraviolet range to near infrared range:
0.01 to 10 parts by weight and transferring the resin-impregnated sheet-shaped inorganic or organic fibrous reinforcing material and means for treating the fiber-reinforced resin with light of a specific wavelength.

[19] A continuous production apparatus for a photocurable prepreg sheet, comprising a back surface film supply means;

means for supplying, onto the surface of the back surface film which moves on continuously, a photocurable resin composition comprising a photocurable resin and a photopolymerization initiator for production of a prepreg sheet and a photopolymerization initiator for main curing of the prepreg sheet;

means for adjusting the thickness of the resin composition on the film;

means for supplying a fibrous reinforcing material onto the resin composition;

means for impregnating the fibrous reinforcing material with a resin;

means for supplying an upper surface film onto the resin-impregnated fibrous reinforcing material;

means for bringing the upper surface film and the resin surface of the fibrous reinforcing material into close contact to each other;

a light irradiation means for prepregnating the photocurable resin composition which has penetrated the fibrous reinforcing material; and means for taking up the resultant prepreg sheet; wherein, throughout the downstream of the back surface film supply means, the back surface film is transferred towards the take-up means at a constant speed.

[20] A continuous production apparatus for a photocurable prepreg sheet, comprising:

a back surface film supply means;

means for supplying, onto the surface of the back surface film, a photocurable resin composition comprising a photocurable resin and a photopolymerization initiator for formation of a resin layer and a photopolymerization initiator for main curing of the prepreg sheet;

means for adjusting the thickness of the resin composition on the film;

a light irradiation means for prepregnating the resin composition;

means for supplying, onto the surface of the resin layer, a photocurable resin composition comprising a photocurable resin and a photopolymerization initiator for production of a prepreg sheet and a photopolymerization initiator for main curing;

means for adjusting the thickness of the resin composition on the film;

means for supplying a fibrous reinforcing material onto the resin composition;

means for impregnating the fibrous reinforcing material with the photocurable resin composition;

means for supplying an upper surface film onto the resin-impregnated fibrous reinforcing material;

means for bringing the upper surface film and the resin surface of the fibrous reinforcing material into close contact to each other;

a light irradiation means for prepregnating the photocurable resin composition which has penetrated the fibrous reinforcing material; and means for taking up the resultant prepreg sheet; wherein, throughout the downstream of the back surface film supply means, the back surface film is transferred towards the take-up means at a constant speed.

[21] A continuous production apparatus for a photocurable prepreg sheet, comprising a back surface film supply means;

means for supplying, onto the surface of the back surface film, a photocurable resin composition comprising a photocurable resin and a photopolymerization initiator for production of a prepreg sheet and a photopolymerization initiator for main curing of the prepreg sheet;

means for adjusting the thickness of the resin composition on the film;

means for supplying a fibrous reinforcing material onto the resin composition;

means for impregnating the fibrous reinforcing material with a photocurable resin composition;

a light irradiation means for prepregnating the photocurable fiber-reinforced resin composition layer;

means for supplying, onto the prepregnated fiber-reinforced resin layer, a photocurable resin composition comprising a photocurable resin and a photopolymerization initiator for forming a resin layer and a photopolymerization initiator for main curing of the prepreg sheet;

means for adjusting the thickness of the photocurable resin composition on the fiber-reinforced resin layer;

means for supplying an upper surface film onto the photocurable resin composition;

means for bringing the upper surface film and the resin-composition-layer surface into close contact to each other;

a light irradiation means for prepregnating the photocurable resin composition; and means for taking up the resultant prepreg sheet;

wherein, throughout the downstream of the back surface film supply means, the back surface film is transferred towards the take-up means at a constant speed.

[22] A waterproofing method comprising affixing, onto a substrate, a photocurable prepreg sheet for waterproofing as recited in any one of [1] through [8] and irradiating the sheet with light so as to cure the sheet, to thereby form an FRP lining layer.

[23] A waterproofing method according to [22], wherein the light for curing the photocurable prepreg sheet for waterproofing is visible light.

According to the present invention, there can be manufactured a prepreg sheet which exhibits stable prepregnated conditions, as well as a prepreg sheet having a buffer layer. Since reactive diluents such as styrene monomers in the resin participate in the thickening mechanism, the reactive monomers do not escape from the fibrous substrate during storage of the prepreg sheet. Moreover, the present invention provides a waterproofing material and a waterproof-coating method which, in connection with waterproofing work, provide a number of advantages; setting is completed within a short period of time with reduced vaporization of styrene monomers, and the mentioned drawbacks—such as intricate procedures required for the addition of the peroxide catalyst and difficulty in the adjustment of pot life of the resin—are satisfactorily overcome.

PREFERRED EMBODIMENTS OF THE INVENTION

Figure 1:
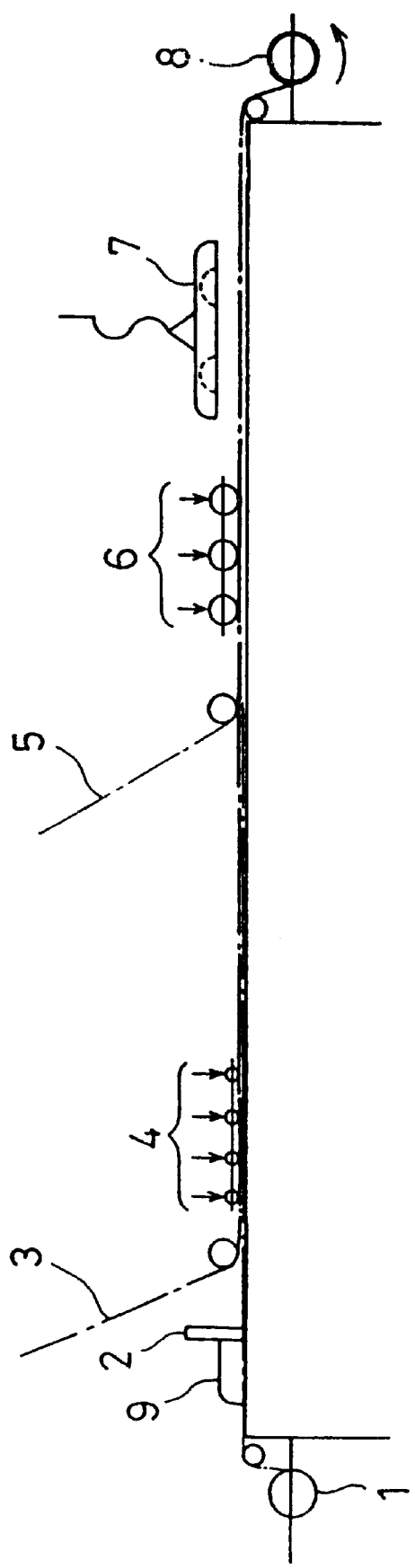
FIG. 1 shows one embodiment of a continuous production apparatus for a photocurable prepreg sheet for waterproofing according to the present invention.

In the present invention, the thermosetting resin comprises at least one of an unsaturated polyester resin or a vinyl ester resin (hereinafter the two types of resin may be collectively referred to as resin or resins).

Typically, the unsaturated polyester resins which may be used in the present invention are condensation products which are obtained through esterification of a polyhydric alcohol with an unsaturated polybasic acid (and an optional saturated polybasic acid) and dissolved in a polymerizable monomer such as styrene. Such resins are described in "Polyester Resin Handbook" (Nikkan Kogyo Shin-bun Sha, published in 1988), *"Toryo Yogo Jiten"* (edited by Sikizai Kyokai, published in 1993), etc.

The vinyl ester resins are also called epoxy acrylate resins, and generally refer to compounds having polymerizable unsaturated bonds which are obtained through ring-opening reaction between a compound having a glycidyl group (an epoxy group), and a carboxyl group contained in a carboxyl compound having a polymerizable unsaturated bond, such as acrylic acid, and are dissolved in a polymerizable monomer such as styrene. These resins are described in "Polyester Resin Handbook" (Nikkan Kogyo Shin-bun Sha, published in 1988), "*Toryo Yogo Jiten*" (edited by Sikizai Kyokai, published in 1993), etc.

The unsaturated polyesters which serve as source material for the resins may be produced through a known method. Specifically, the polyesters are produced through reaction between a polybasic acid or an anhydride thereof—which serves as an acid component—and a polyhydric alcohol—which serves as an alcohol component. Examples of the acid or acid anhydrides include saturated polybasic acids having no polymerizable unsaturated bond, such as phthalic anhydride, isophthalic acid, terephthalic acid, tetrahydrophthalic acid, adipic acid, or sebacic acid; and unsaturated polybasic acids having an active unsaturated bond such as fumaric acid, maleic anhydride, maleic acid, or itaconic acid. Examples of the alcohol include ethylene glycol, propylene glycol, diethylene glycol, dipropylene glycol, 1,2-butanediol, 1,3-butanediol, 1,5-pentanediol, 1,6-hexanediol, 2-methyl-1,3-propanediol, 2,2-dimethyl-1,3-propanediol, cyclohexane-1,4-dimethanol, bisphenol A-ethylene oxide adducts, and bisphenol A-propylene oxide adducts.

The vinyl esters of the vinyl ester resins (epoxy acrylate resins) may be produced by a known method. Specific examples include epoxy (meth)acrylates which are obtained by reacting an epoxy resin with an unsaturated monobasic acid such as acrylic acid or methacrylic acid; and polyester (meth)acrylates which are obtained by reacting a carboxyl-terminated saturated or unsaturated polyester—wherein the polyester is obtained from a saturated dicarboxylic acid and/or an unsaturated dicarboxylic acid and a polyhydric alcohol—with an epoxy compound having an α,β-unsaturated carboxylic acid ester group.

Examples of the epoxy resins serving as source material include bisphenol A diglycidyl ether, its high-molecular weight homologues, and novolak polyglycidyl ethers.

Examples of the saturated dicarboxylic acid used for the carboxyl-terminated polyester (raw material for vinyl ester) include a dicarboxylic acid having no active unsaturated group, such as phthalic acid, isophthalic acid, terephthalic acid, tetrahydrophthalic acid, adipic acid, or sebacic acid. Examples of the unsaturated dicarboxylic acid include a dicarboxylic acid having an active unsaturated group such as fumaric acid, maleic anhydride, maleic acid, or itaconic acid.

Examples of the polyhydric alcohol component include ethylene glycol, propylene glycol, diethylene glycol, dipropylene glycol, 1,2-butanediol, 1,3-butanediol, 1,5-pentanediol, 1,6-hexanediol, 2-methyl-1,3-propanediol, 2,2-dimethyl-1,3-propanediol, cyclohexane-1,4-dimethanol, bisphenol A-ethylene oxide adducts, and bisphenol A-propylene oxide adducts.

A typical example of the epoxy compound having an α,β-unsaturated carboxylic acid ester group which is used in the production of the vinyl esters is glycidyl methacrylate.

The unsaturated polyesters or vinyl esters constituting the resins preferably have a comparatively high unsaturation ratio, and those having an unsaturated group equivalent (molecular weight per unsaturated group) of about 100–800 are preferably used. When the equivalent is less than 100, the synthesis of the ester is difficult, whereas when it is in excess of 800, a cured product having high hardness cannot be obtained.

The unsaturated polyester resins or vinyl ester resins which are used in the present invention comprise the above-described unsaturated polyesters or vinyl esters blended with a monomer having an unsaturated group, such as a styrene monomer. The monomer having an unsaturated group added to the resins of the present invention is important, during the production of composite materials, for enhancing kneadability with a filler and impregnation performance into a fibrous reinforcing material, as well as for improving properties of molded products, such as hardness, strength, chemical resistance, or water resistance. The monomer is used in an amount of 10–250 parts by weight based on 100 parts of the vinyl unsaturated polyester or ester, preferably 20–100 parts by weight. When the amount is less than 10 parts by weight, viscosity of the resins increases to provide difficulty in molding, whereas when the amount is in excess of 250 parts by weight, a cured product having high hardness cannot be obtained; such a product has insufficient heat resistance and the resins are proven to be undesirable FRP materials.

The styrene monomer serving as a reactive diluent may be partially or completely replaced with a polymerizable monomer such as a styrenic monomer, e.g., chlorostyrene, vinyltoluene, and divinylbenzene; and a polymerizable monomer having a (meth)acryloyl group, e.g., methyl (meth)acrylate, ethyl (meth)acrylate, and ethylene glycol di(meth)acrylate, so long as such a replacement does not affect the effect of the present invention.

Preferable examples of the photopolymerization initiator having photosensitivity in a visible light or near infrared light range that is used in the present invention include a combination of a cationic dye represented by formula (1):

wherein $D^+$ represents a dye cation having photosensitivity in a visible light or near infrared light range derived from methine, polymethine, xanthene, oxazine, thiazine, arylmethane, or pyrylium, and $A^-$ represents anions; and an organic quaternary boron compound represented by formula (2):

wherein $Z^+$ represents an arbitrary cation; each of $R^1$, $R^2$, $R^3$, and $R^4$ represents an alkyl group, an aryl group, an aralkyl group, an alkenyl group, an alkynyl group, a silyl group, a heterocyclic group, or a halogen atom).

With regard to $R^1$, $R^2$, $R^3$, and $R^4$ in formula (2), each of the alkyl group, aryl group, aralkyl group, alkenyl group, alkynyl group, silyl group, and heterocyclic group may have an arbitrary substituent. Specific examples of such a substituent include, but are not limited to, methyl group, ethyl group, n-propyl group, isopropyl group, n-butyl group, sec-butyl group, isobutyl group, tert-butyl group, n-octyl group, n-dodecyl group, cyclopentyl group, cyclohexyl group, phenyl group, tolyl group, xylyl group, anisyl group, biphenyl group, naphthyl group, benzyl group, phenethyl group, diphenylmethyl group, methoxy group, ethoxy group, n-propoxy group, isopropoxy group, n-butoxy group, sec-butoxy group, tert-butoxy group, methylenedioxy group, ethylenedioxy group, phenoxy group, naphthoxy group, benzyloxy group, methylthio group, phenylthio group, 2-furyl group, 2-thienyl group, 2-pyridyl group, and fluoro group.

Specific examples of the organic quaternary boron-containing anion in formula (2) include n-butyltriphenylborate, n-octyltriphenylborate, n-dodecyltriphenylborate, sec-butyltriphenylborate, tert-butyltriphenylborate, benzyltriphenylborate, n-butyltri(p-anisyl)borate, n-octyltri(p-anisyl)borate, n-dodecyltri(p-anisyl)borate, n-butyltri(p-tolyl)borate, n-butyltri(o-tolyl)borate, n-butyltri(4-tert-butylphenyl)borate, n-butyltri(4-fluoro-2-methylphenyl)borate, n-butyltri(4-fluorophenyl)borate, n-butyltrinaphthylborate, triphenylsilyltriphenylborate, trimethylsilyltriphenylborate, tetra-n-butylborate, di-n-butyldiphenylborate, and tetrabenzylborate. Boron-containing anions having a structure in which $R^1$ is an alkyl group, and $R^2$, $R^3$, and $R^4$ are aryl groups are preferred, in consideration of well-balanced stability and setting property.

Examples of the cation $[Z^+]$ in formula (2) include those having no photosensitivity in a visible light or near infrared light range such as a quaternary ammonium cation; a quaternary pyridinium cation; a quaternary quinolinium cation; diazonium cations; a tetrazolium cation; a sulfonium cation; an oxosulfonium cation; metal cations such as a cation of sodium, potassium, lithium, magnesium, or calcium; organic compounds having a cationic charge on an oxygen atom such as a flavylium or pyranium salt; carbon cations such as tropylium or cyclopropylium; halogenium cations such as iodonium; and cations of a compound containing metals such as arsenic, cobalt, palladium, chromium, titanium, tin, or antimony.

By use of a combination of the organic quaternary boron compound and a dye having a wavelength for photosensitization in the visible light or near infrared light range, the dye irradiated with light having a wavelength in the photosensitizable range is excited and subsequently, electron transfer between the dye and the organic quaternary boron compound decolors the dye and induces generation of radicals, which initiate a polymerization of coexisted polymerizable unsaturated compound. In this polymerization process, radical generation is easily controlled, which is difficult in the conventionally known UV-beam polymerization, and reaction can be terminated when part of the unsaturated groups in resins is radically polymerized, which feature is particularly advantageous in prepregnation through prepolymerization according to the present invention. This process is also advantageous in that the reaction can be performed even in a system incorporated with a filler and a pigment, due to use of a longer wavelength in the visible light or near infrared light range.

Examples of the above-described combination of the cationic dye and the organic quaternary boron compound include combinations described in detail in Japanese Patent Application Laid-Open (kokai) Nos. 3-111402, 3-179003, 4-146905, 4-261405, 4-261406, European Patent Publication EP-A2-438123, etc.

Specific examples of the cationic dye $[D^+]$ are shown in Table 1 and Table 2. Among these cationic dyes, cyanines as polymethine compounds; styryl compounds; and triarylmethane compounds are preferably used. Typically, cyanine compounds and styryl compounds easily accept electrons from organic quaternary boron compounds, thus, they easily cause a reaction of the present invention; whereas triarylmethane compounds are preferred in that coloring of prepregs is remarkably suppressed after passage of time.

TABLE 1

| No. | Chemical Structure | Maximum absorption wavelength (TMPT) |
|---|---|---|
| 1 | | 820 nm |
| 2 | | 830 nm |

TABLE 1-continued
| No. | Chemical Structure | Maximum absorption wavelength (TMPT) |
|---|---|---|
| 3 | 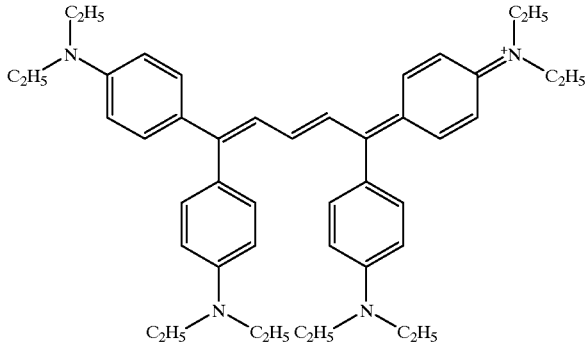 | 822 nm |
| 4 | 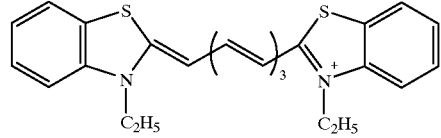 | 768 nm |
| 5 | 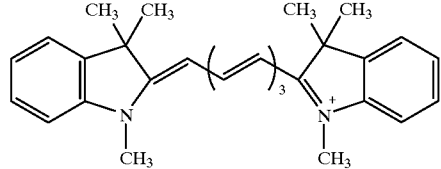 | 748 nm |
| 6 | 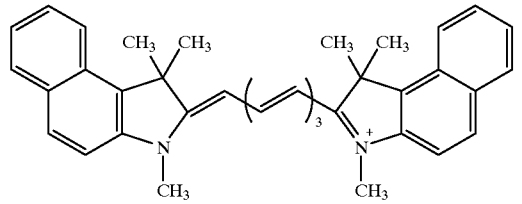 | 785 nm |
| 7 | 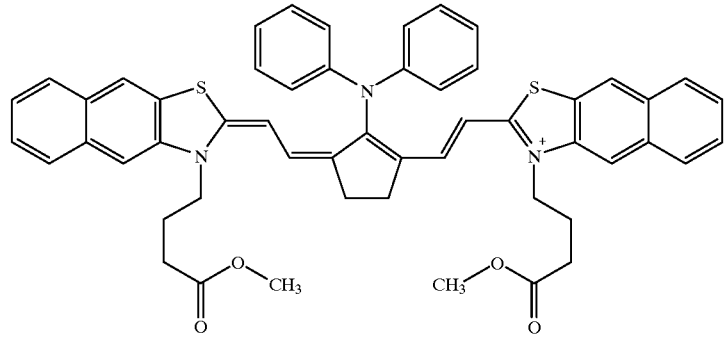 | 828 nm |
| 8 | 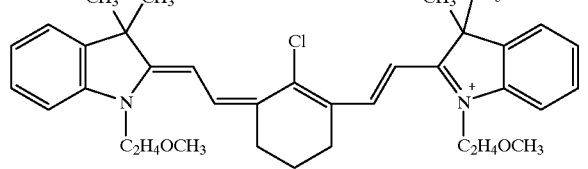 | 787 nm |

TABLE 1-continued

| No. | Chemical Structure | Maximum absorption wavelength (TMPT) |
|---|---|---|
| 9 | | 819 nm |
| 10 | | 1080 nm |

TMPT stands for trimethylolpropane trimethacrylate.

TABLE 2

| No. | Chemical Structure | Maximum absorption wavelength (solvent) |
|---|---|---|
| 1 | | 522 nm (acetonitrile) |
| 2 | | 528 nm (acetonitrile) |
| 3 | | 549 nm (acetonitrile) |
| 4 | | 559 nm (acetonitrile) |

TABLE 2-continued
| No. | Chemical Structure | Maximum absorption wavelength (solvent) |
|---|---|---|
| 5 | 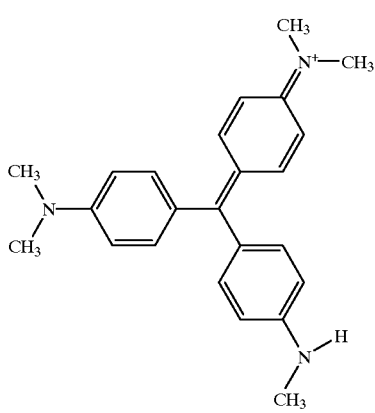 | 584 nm (acetonitrile) |
| 6 | 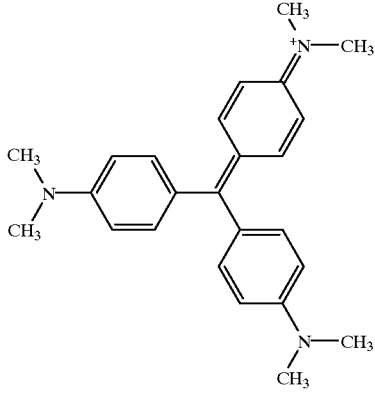 | 589 nm (acetonitrile) |
| 7 | 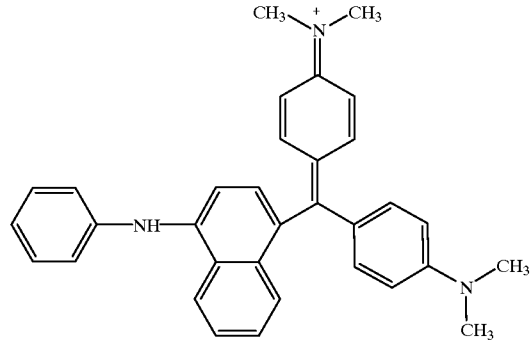 | 613 nm (acetonitrile) |

TABLE 2-continued

| No. | Chemical Structure | Maximum absorption wavelength (solvent) |
|---|---|---|
| 8 | (structure shown) | 615 nm (acetonitrile) |
| 9 | (structure shown) | 632 nm (acetonitrile) |

A counter anion [A⁻] of the cationic dye represented by formula (1) may be any cation, examples of which include a p-toluenesulfonate ion, organic carboxylate ions, perchlorate ion, and halide ions. Particularly preferred are quaternary or tetracoordinated borate anions represented by formula (3):

(3)

wherein each of $R^5$, $R^6$, $R^7$, and $R^8$ independently represents an alkyl group, an aryl group, an aralkyl group, an alkenyl group, an alkynyl group, a silyl group, a heterocyclic group, or a halogen atom.

The organic quaternary boron compound and near infrared light- or visible light-absorbing cationic dye compound are contained in a compositional ratio by weight of 1/5–1/0.05, preferably 1/1–1/0.1. Generally, the preferable compositional ratio of the organic quaternary boron compound to the cationic dye is 1/1 by weight or more in view of decoloration reaction of the dye and efficiency of radical generation.

Examples of known visible light-polymerization initiators having photosensitivity in a visible light range include single visible light-polymerization initiators such as camphorquinone, benzil, trimethylbenzoyldiphenylphosphine oxide, methylthioxanthone, or dicyclopentadienyltitanium-di(pentafluorophenyl), which are described in Yamaoka et al., "Hyomen," 27(7), 548 (1989), Sato et al., "Resumes of the Third Polymer Material Forum," IBP18 (1994), etc.; and combination initiator systems such as organic peroxide/dye systems; diphenyliodonium salt/dye systems; imidazole/keto compound systems; hexaarylbiimidazole compound/hydrogen-donating compound systems; mercaptobenzothiazole/thiopyrylium salt systems; metal arene/cyanine dye systems; and a hexaarylbiimidazole/radical-generator system which is described in Japanese Patent Publication (kokoku) No. 45-37377.

There may also be used known acylphosphine oxide compounds having photosensitivity in the range from a UV light range to a visible light range such as bis(2,6-dimethoxybenzoyl)-2,4,4-trimethylpentylphosphine oxide, bis(2,4,6-trimethylbenzoyl)-methylphosphine oxide, 2,4,6-trimethylbenzoyl-diphenylphosphine oxide or 2,6-dimethoxybenzoyl-diphenylphosphine oxide. Examples include Irugacure 1700 (product of Ciba Specialty Chemicals, Co., Ltd.) which is a 75/25 (weight ratio) mixture of 2-hydroxy-2-methyl-1-phenylpropan-1-one (Darocur 1173: product of Ciba Specialty Chemicals, Co., Ltd.) and bis(2,6-dimethoxybenzoyl)-2,4,4-trimethylpentylphosphine oxide (product of Ciba Specialty Chemicals, Co., Ltd.); Irugacure 1800 (product of Ciba Specialty Chemicals, Co., Ltd.) which is a 75/25 (weight ratio) mixture of 1-hydroxy-cyclohexylphenylketone (Irgacure 184: product of Ciba Specialty Chemicals, Co., Ltd.) and bis(2,6-dimethoxybenzoyl)-2,4,4-trimethylpentylphosphine oxide (product of Ciba Specialty Chemicals, Co., Ltd.); Irugacure 1850 (product of Ciba Specialty Chemicals, Co., Ltd.) which is a 50/50 (weight ratio) mixture; bis(2,4,6-trimethylbenzoyl)-phenylphosphine oxide (Irgacure 819: product of Ciba Specialty Chemicals, Co., Ltd.); 2,4,6-trimethylbenzoyl-diphenylphosphine oxide (Lucirin TPO, product of BASF Co.); and Darocur 4265 which is a 50/50 (weight ratio) mixture of 2-hydroxy-2-methyl-1-phenylpropan-1-one (Darocur 1173: product of Ciba Specialty Chemicals, Co., Ltd.) and Lucirin TPO.

No particular limitation is imposed on the visible light-polymerization initiators so long as they have photosensitivity in the wavelength range of 380–780 nm, and they may be used in combination.

The visible light range-polymerization initiators are used in an amount of typically 0.01–20 parts by weight based on 100 parts of a resin, preferably 0.05–15 parts by weight. When the amount is less than 0.01 part by weight, polymerization tends to becomes insufficient, whereas the use thereof in excess of 20 parts by weight is economically disadvantageous and may deteriorate the physical properties of the cured products.

The at least two photopolymerization initiators which have different photosensitization wavelength ranges between the ultraviolet light range and the near infrared light range is used in an amount of 0.01–20 parts by weight, preferably 0.05–15 parts by weight, based on 100 parts by weight of the resin. Use of the photopolymerization initiators in amounts of less than 0.01 part causes insufficient thickening reaction or insufficient polymerization after thickening, whereas amounts in excess of 20 parts by weight results in insufficient strength of the hardened product.

In the case in which a photopolymerization initiator for prepregnating reaction and that for main curing of the prepregnated product are used in combination, the proportion of the two is 0.1/5 to 5/0.1, preferably 0.5/5 to 5/0.5, on a weight basis. If the proportion of a photopolymerization initiator for prepregnating reaction to that for main curing of the prepregnated product is less than 0.1/5, a thickening reaction may not proceed even when a composition for a photocurable prepreg sheet for waterproofing is irradiated with light having a wavelength corresponding to the photosensitization wavelength of the photopolymerization initiator for prepregnating reaction. On the other hand, when the ratio is greater than 5/0.1, the thickening reaction proceeds excessively.

The fibrous reinforcing materials to be used in the present invention are those comprising organic and/or inorganic fibers. There may be employed a variety of known fibers, such as glass fiber, carbon fiber, aramid fiber, polyethyleneterephthalate fiber, Vinylon fiber, polyamide fiber, metallic fiber, and ceramic fiber. Needless to say, two or more of these fibers may be used in combination. Of these reinforcing materials, the present invention particularly favors glass fiber or organic fiber. In consideration of ease in installation work, a mat-like fiber product is preferred.

The prepreg sheet of the present invention may contain a filler. The filler which may be used is an inorganic filler, an organic filler, or a polymer. Examples of the inorganic filler include known ones such as aluminum hydroxide, calcium carbonate, talc, clay, glass powder, 2 silica, barium sulfate, titanium oxide, and cement. These inorganic fillers may be used in combination. The amount of the inorganic filler is 50–300 parts by weight, preferably 100–200 parts by weight, based on 100 parts by weight of the polymerizable unsaturated compound. If the inorganic filler is in excess of 300 parts by weight, the viscosity increases to result in deteriorated handling properties, and in addition, foams tend to persist to reduce the strength. On the other hand, if the inorganic filler is used in an amount of less than 50 parts by weight, there may not be obtained an excellently workable composition for preparing a photocurable prepreg sheet for waterproofing, and thus such an amount is not preferred.

In the present invention, thixotropy may be inparted by a known method. Examples of a thixotropic agent include silica powder (aerosil type), mica powder, and calcium carbonate powder, and these may be incorporated in amounts of 0.1–50 parts by weight per 100 parts by weight of the polymerizable unsaturated compound.

Examples of organic fillers and polymers which may be contained in the compositions of the present invention include those which may also serve as low-shrinkage materials, such as known polystyrene, polyvinyl acetate, polymethyl methacrylate, polyethylene, polyvinylidene chloride microballoon, and polyacrylonitrile microballoon. In order to serve as low-shrinkage materials, they are used in amounts of 0.1–40 parts by weight, preferably 1–30 parts by weight, based on 100 parts by weight of resin. Amounts in excess of 40 parts by weight results in degraded moldability due to excessively high viscosity, and in addition, decreases in smoothness of the surface of the cured product and in heat resistance.

In the present invention, a dye or pigment may be used. No particular limitation is imposed on the type thereof. Organic and inorganic ones may be used. Amounts of the dyes or pigments are 20 parts by weight at most, preferably up to 10 parts by weight, based on 100 parts by weight of the resin.

The film which is used in the manufacture of the prepreg sheet of the present invention is a known one, such as Vinylon film, PET (Polyethyleneterephthalate) film, polyethylene film, polypropylene film, and Cellophane. These films may be of the transparent type or the colored type. In order to prolong the pot life when the composition of the present invention is used outdoors, it is preferred to use a film, solely or in combination, which permits passage of only minimum amounts of light falling within a wavelength range which corresponds to the photosensitization wavelength range of the photopolymerization initiator present in the prepreg sheet. Aluminum foil and release paper may also be used.

In the present invention, the words "ultraviolet light," "visible light," and "near infrared light" refer to light having a wavelength of 380 nm or less, light having a wavelength of 380–780 nm, and light having a wavelength of 780–1200 nm, respectively.

The light source which is used in the manufacture of a prepreg by the prepregnating reaction of the present invention should have a spectral distribution within the photosensitization wavelength range of the photopolymerization initiator. For example, there may be used a near infrared lamp, a sodium lamp, a halogen lamp, a fluorescent lamp, or a metal halide lamp. These lamps or light sources of broader wavelengths may be combined with a wavelength cutting filter so that light having a suitable wavelength for prepregnation may be selected for irradiation.

The irradiation time from a lamp in the manufacture of a photocurable prepreg sheet for waterproofing is not univocally determined, since light sources have different effective wavelength ranges and output powers, and the irradiation distance and the thickness of the composition product may vary. However, irradiation time of not shorter than 0.01 hour, preferably not shorter than 0.05 hours, suffices.

The thus-manufactured prepared photocurable prepreg sheet for waterproofing can be cured in a full scale through irradiation with light, due to the presence of the remaining photopolymerization initiator. Usable light sources for full-scale curing are those having a spectral distribution in the photosensitization wavelength range of the photopolymerization initiator. Mentioned may be given of solar light, metal halide lamps, halogen lamps, and UV lamps.

EXAMPLES

The present invention will next be described in more detail by way of examples and comparative examples, wherein "parts" are on a weight basis. The present invention is in no way limited only to these examples.

Example 1

To 100 parts of nonstyrenic bisphenol-A type vinyl ester resin (trade name: Ripoxy NSR-112, product of Showa Highpolymer Co., Ltd.), there were added a near infrared light photopolymerization initiator for prepregnating comprising 0.03 parts of 1,1,5,5-tetrakis(p-diethylaminophenyl)-2,4-pentadienyl•n-butyltriphenylborate (product of Showa Denko K.K, abbreviated as IRB hereinafter, a near infrared light absorbing cationic dye) and 0.15 parts of tetra-n-butylammonium•n-butyltriphenylborate (product of Showa Denko K.K, abbreviated as P3B hereinafter, an organic quaternary boron compound), and 1.0 part of a polymerization initiator of the acylphosphine oxide compound type (trade name: Irgacure 1800, product of Ciba Specialty Chemicals, abbreviated as I-1800 hereinafter)—which is for full-scale curing of the prepregnated product and which has photosensitivity within the range from ultraviolet light to visible light—to thereby obtain a photocurable resin composition.

The thus-obtained photocurable resin composition was cast into a mold having a thickness of 3 mm and made of pane glass coated with PET film. The cast composition was irradiated with light from a 1 KW AL-spotlight (ALF-10) (product of RDS Corp.), which is a light source comprising a wavelength range of 380 to 1200 nm, from a distance of 50 cm with combined use of a filter for cutting wavelength of 500 nm or less. Five-minute irradiation successfully yielded a prepregnated product. The product remained prepregnated after another 5-minute irradiation. The thus-obtained prepregnated product was taken out of the mold, and subsequently coated with Vinylon film, to serve as a buffer layer prepregnated product.

The thus-obtained buffer layer prepregnated product was allowed to stand for 10 minutes in direct sunlight while remaining coated with the Vinylon film. Then, the mechanical strength of the product was measured according to JIS K-6911 and found to exceed the level attained under room-temperature-setting by a peroxide. The results are shown in Table 3.

Comparative Example 1

To the same resin as used in Example 1, there were added 1.0 part of 328E (product of Kayaku Akzo K.K.) which serves as room temperature curing cumene hydroperoxide catalysts and 0.5 parts of cobalt naphthenate (Co:6%). The resultant resin was cast into a mold having a thickness of 3 mm and made of pane glass coated with PET film, and then allowed to stand for 24 hours at room temperature, to thereby set at room temperature. The mechanical strength of the product was measured. The results are shown in Table 3.

TABLE 3

| | Example 1 | Comparative Example 1 |
|---|---|---|
| Resin | Ripoxy NSR-112 | Ripoxy NSR-112 |
| Initiator | P3B/IRB (0.15/0.03) I-1800 (1.0) | 328E/Co naphthenate (1.0/0.5) |
| Prepregnating condition | AL spotlight: 5 min | — |
| Curing condition | Direct sunlight: 10 min | Ambient temp.: 24 hr |
| Bending strength (MPa) | 45 | 40 |
| Flexural modulus (MPa) | 1070 | 980 |
| Tensile strength (MPa) | 24 | 20 |
| Tensile elastic modulus (MPa) | 870 | 760 |
| Tensile Elongation (%) | 13 | 11 |

Example 2

To 100 parts by weight of an unsaturated polyester resin of the light-weight iso type (Rigolac FK-2000, product of Showa Highpolymer Co., Ltd.), there were added a visible light photopolymerization initiator for prepregnating comprising 0.03 parts of a visible light absorbing dye (counter ion: n-butyltriphenylborate, product of Showa Denko K.K) and 0.12 parts of tetra-n-butylammonium•n-butyl-tri(p-tert-butylphenyl)borate (product of Showa Denko K.K, abbreviated as BP3B hereinafter, an organic quaternary boron compound), and 1.0 part of I-1800 having photosensitivity in the range from ultraviolet light to visible light and curing a prepregnated product in a full scale, to thereby obtain a photocurable resin composition. A glass fiber #450 chopped strand mat (30 cm×30 cm, product of Asahi Fiberglass Co., Ltd.) was impregnated with the thus-obtained photocurable resin composition so that 1 ply came to have a glass content of 30 wt %. The top and bottom surfaces of the resultant mat were coated with Vinylon film.

The resultant product was irradiated with light from a 1 KW AL-spotlight (ALF-10) (product of RDS Corp.), which is a light source comprising a wavelength range of 380 to 1200 nm, from a distance of 50 cm with combined use of a filter for cutting wavelength 500 nm or less. Five-minute irradiation successfully yielded a prepregnated product. The product remained prepregnated after another 5-minute irradiation. The thus-obtained prepregnated product would serve as a prepreg sheet for the FRP lining layer.

The thus-obtained prepreg sheet for the FRP lining layer was allowed to stand for 10 minutes in direct sunlight while remaining coated with the Vinylon film. Then, the mechanical strength of the product was measured according to JIS K-6911 and found to exceed the level attained by room-temperature-setting by a peroxide. The results are shown in Table 4.

Comparative Example 2

To the same resin as used in Example 2, there were added 1.0 part of Parmeck N (product of NOF Corp.) which serves as room temperature curing catalysts of the methyl ethyl ketone peroxide type and 0.5 parts of cobalt naphthenate (Co:6%). A glass fiber #450 chopped strand mat (30 cm×30 cm, product of Asahi Fiberglass Co., Ltd.) was impregnated with the resultant resin so that 1 ply came to have a glass content of 30 wt %. The top and bottom surfaces of the resultant composition were coated with Vinylon film. The coated product was allowed to stand for 24 hours at room temperature, to thereby set at room temperature. The mechanical strength of the product was measured according to JIS K-6911. The results are shown in Table 4.

Example 3

A method for continuously Manufacturing a Photocurable Prepreg Sheet for Waterproofing
(A photocurable Resin Composition)

To 100 parts by weight of Rigolac FK-2000, there were added a near infrared photopolymerization initiator for prepregnating comprising 0.2 parts of P3B and 0.07 parts of IRB, and 0.5 parts of I-1800, which serves as a photopolymerization initiator for performing a main curing of the prepregnated product, to thereby obtain a photocurable resin composition.

(Apparatus for Manufacturing a Prepreg by Irradiation of Light)

There was manufactured a driving machine as shown in FIG. 1, which has a planar portion between a material supplying section and a sheet winding section, the planar portion having an effective width of 1000 mm and an effective length of 6000 mm. On this planar portion, a roll for impregnation (means for impregnating a fibrous reinforcing material with resin: 4), a light irradiation apparatus (7), and the like can be installed, and a release film (a bottom film: 1) can move at a constant velocity from the front of the raw material supplying section (a photocurable resin composition: 9) to the sheet take-up section (8).

On the planar portion, there were installed a flat roll (outer diameter: 50 mm), four fluted rolls (outer diameter: 50 mm), and two smaller fluted rolls (outer diameter: 30 mm) in this order in the downstream direction. Each of these rolls had a width of 1200 mm, and was fixed on a frame of the machine via springs.

Further downstream from the rolls on the planar portion, there were installed four 2 kw halogen lamps with a filter for cutting wavelength 500 nmn or less attached at a height of 30 cm so that an illuminance within an area having a width of 1000 mm and a length of 2000 mm became 60 to 80 mW/cm$^2$ (400 to 1000 nm), which served as a zone for prepregnating (means for light irradiation for prepregnating: 7).

At the material supplying section, there w as installed a knife coater (means for adjusting thickness: 2) so that a clearance between the knife edge an d the film (the bottom film: 1) became 1 mm. Downstream from the knife coater, there was installed a mat unwinder (means for supplying a fibrous reinforcing material: 3), to laminate a glass fiber #450 chopped strand mat (3) over the photocurable resin composition (9) that was coated over the film (1) so that the coating had a uniform thickness.

(Continuous Production of a Photocurable Prepreg Sheet for Waterproofing)

By use of the apparatus described above, the glass fiber #450 chopped strand mat (3) having a width of 1 m was impregnated with the photocurable resin composition (9) over the Vinylon film (1) at a line speed of 50 cm/min. The top surface of the resin composition was also covered with the Vinylon film (5). The coated resin composition was subjected to irradiation with 2 KW halogen lamps (7) from a distance of 30 cm, to thereby prepregnate the composition. About 10 cm of the sheet was wound around a paper tube, to thereby obtain a photocurable prepreg sheet for waterproofing.

The thus-obtained photocurable prepreg sheet for waterproofing remained stable in a prepregnated condition without the outflow of resin even after being stored in a dark place for two months at 30° C. Its photocurability remained stable; 10 minutes in direct sunlight, and 30 minutes in sunshade. The prepreg sheet that had been stored in a dark place for 2 months was laminated into three plies, and the resultant laminated sheet was allowed to stand in direct sunlight for 10 minutes, to thereby cure the sheet. The cured laminated sheet exhibited excellent adhesion between layers as well as a sufficient level of mechanical strength. The mechanical strength of the laminated sheet as measured according to JIS K-6911 is shown in Table 4.

TABLE 4

|  | Ex. 2 | Comp. Ex. 2 | Ex. 3 |
| --- | --- | --- | --- |
| Resin | Rigolac FK-2000 | Rigolac FK-2000 | Rigolac FK-2000 |
| Reinforcing material | Glass fiber #450 chopped strand mat | | |
| Initiator | BP3B(0.12), Visible light absorbing dye in Tables 2–6 (0.03), I-1800 (1.0) | Permeck N/ Co naphthenate (1.0/0.5) | P3B/IRB (0.2/0.07) I-1800 (0.5) |
| Prepregnating condition | AL spotlight: 5 min | — | 2 KW halogen lamp: 30 cm |
| Curing condition | Direct sunlight: 10 min | Ambient temp.: 24 hr | Direct sunlight: 10 min |
| Bending strength (MPa) | 110 | 100 | 115 |
| Flexural modulus (MPa) | 3700 | 3400 | 3750 |
| Tensile strength (MPa) | 104 | 95 | 109 |
| Tensile elastic modulus (MPa) | 4700 | 4450 | 4800 |
| Tensile Elongation (%) | 2.6 | 2.3 | 2.5 |
| Hardness (Shore D) (top/bottom) | 68/68 | 59 | 69/69 |

Example 4

A Method for Continuously Manufacturing a Photocurable Prepreg Sheet for Waterproofing Having a Buffer Layer
(A Photocurable Resin Composition)

To 100 parts by weight of Rigolac FK-2000, there were added a near infrared photopolymerization initiator for prepregnating comprising 0.2 parts of P3B and 0.07 parts of a near infrared light absorbing dye shown in Table 1–3 (counter ion: p-toluenesulfonate anion, product of Showa Denko K.K), and 0.5 parts of I-1800, which serves as a photopolymerization initiator for effecting a main curing of a prepregnated product, to thereby obtain a photocurable resin composition.

(Apparatus for Manufacturing a Prepreg by Irradiation of Light)

Figure 2:
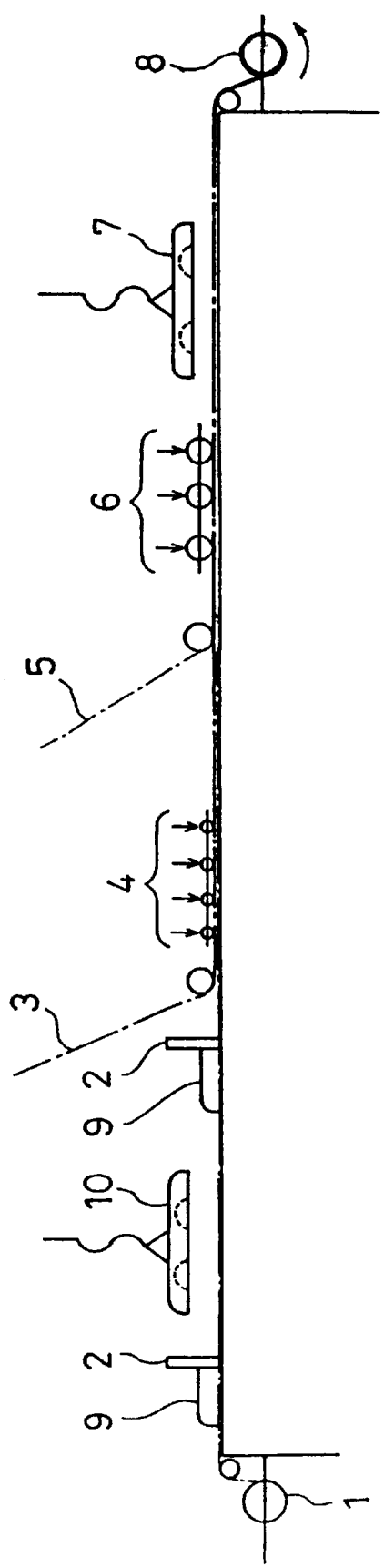
FIG. 2 shows one embodiment of a continuous production apparatus for a photocurable prepreg sheet for waterproofing having a buffer layer according to the present invention.

There was manufactured a driving machine as shown in FIG. 2, which has a planar portion between a material supplying section and a sheet winding section, the planar portion having an effective width of 1000 mm and an effective length of 7000 mm. On the planar portion, a roll for impregnation, light irradiation apparatuses at two positions, and the like can be installed, and a release film can move at a constant velocity from the front of the material supplying section to the sheet winding section.

By use of the knife coater (3) installed at the material supplying section (9) of the apparatus for manufacturing a photocurable prepreg sheet described in Example 3, the photocurable resin composition (9) was coated over the film (1) so that the coating had a uniform thickness. Facing the coated area, there were installed two 2 kw halogen lamps (means for prepregnating a buffer resin composition: 10) with a filter for cutting wavelength 500 nm or less attached at a height of 30 cm so that an illuminance within an area having a width of 1000 mm and a length of 1000 mm became 60 to 80 mW/cm$^2$ (400 to 1000 nm), which served as a zone for prepregnating a buffer layer. There were also installed a section for supplying a material for prepreg (9) and a knife coater (2). The photocurable resin composition was coated over the prepregnated buffer layer so that the coating had a uniform thickness. Over the laminated resin composition, a glass fiber #450 chopped strand mat (3) was laminated to be impregnated with the resin composition. The resultant composition was coated with a Vinylon film (5), to thereby obtain an apparatus for manufacturing a prepreg sheet that permits prepregnating reaction.

(Continuous Production of Photocurable Prepreg Sheets for Waterproofing)

By use of the apparatus described above, a buffer layer containing the photocurable resin composition (9) alone was prepregnated over the Vinylon film (1) at a line speed of 50 cm/min. Over the prepregnated buffer layer, the glass fiber #450 chopped strand mat (3) having a width of 1 m was impregnated with the photocurable resin composition (9). The top surface of the resin composition was coated with the Vinylon film (5). The coated resin composition was subjected to irradiation with 2 KW halogen lamps (7) from a distance of 30 cm, to thereby prepregnate the composition. About 10 cm of the sheet was wound around a paper tube, to thereby obtain a photocurable prepreg sheet for waterproofing. The thus-obtained photocurable prepreg sheet for waterproofing remained stable in a prepregnated condition without the outflow of resin even after being stored in a dark place for two months at 30° C. Its photocurability remained stable; 10 minutes in direct sunlight, and 30 minutes in sunshade. at 30° C. The prepreg sheets, one before storage and the other after being stored in a dark place for 2 months, were laminated into three plies, and the resultant laminated sheets were allowed to stand in direct sunlight for 10 minutes, to thereby cure the sheets. The cured laminated sheets exhibited excellent adhesion between layers as well as sufficient levels of hardness (Shore D) (the upper layer: 69, the lower layer: 65).

Comparative Example 3

There was used the same photocurable resin composition as used in Example 3 except that 0.1 parts of magnesium oxide (trade name: Magmic, product of Kyowa Chemical Industry K.K.) was added instead of P3B and IRB. Unlike the case of Example 3, the resin composition was not subjected to light irradiation with the apparatus for manufacturing prepregs by light irradiation before being wound around paper tubes. The wound resin composition was thickened by being rotated for 2 days in an air layer having a constant temperature of 80° C.

The thus-obtained photocurable prepreg sheet for waterproofing did not remain stable in a prepregnated condition, and had an irregular surface having an uneven thickness. The prepreg sheet was laminated into three plies, and the resultant laminated sheet was allowed to stand in direct sunlight for 10 minutes. The laminated sheet was cured, but exhibited poor adhesion between layers due to an irregular surface. The hardness (shore D) of its upper coat was 68 and that of the lower coat was 67. The cured laminated sheet became unusable after being stored in a dark place at 30° C. for two months because of the outflow and uneven presence of the resin.

Example 5

Installation Test (Application of a Primer)

A one-component urethane primer (trade name: UM-50P, product of Showa Highpolymer Co., Ltd.) was applied with a brush to the top surface (30 cm×30 cm) of a plate (30 cm×30 cm×6 cm) of concrete sidewalk. The surface became dry after the plate was allowed to stand for 1 hour at ambient temperature.

(FRP Lining)

The Vinylon film was removed from the photocurable prepreg sheet for waterproofing obtained in Example 3. The sheet was then laminated in three plies over the dry surface to which the primer was applied while being pressed (the top surface remained coated with the Vinylon film). The sheet was then allowed to stand in direct sunlight for 10 minutes to be cured completely. Subsequently, the Vinylon film that had coated the cured surface was removed. The operation was easy and took only a short time, with only very subtle odor of styrene being generated during the installation work.

(Adhesion Test)

In order to inspect the adhesion of the photocurable prepreg sheet for waterproofing, an ADHESION TESTER elcometer was used to examine the adhesive strength and state caused by destruction in a bonded area of 4.9 cm$^2$. It was observed that the concrete, which was the base material, was destroyed, and that approximately 5 to 10 mm of the concrete was separated. Thus, adhesion between the photocurable prepreg sheet and concrete as well as between FRP layers was confirmed to be excellent. It was also confirmed that the photocurable prepreg sheet for waterproofing is easy to install and is endowed with satisfactory properties. The results are shown in Table 5.

Example 6

Installation Test (Application of a Primer)

The same operation as in Example 5 was performed.

(FRP Lining)

The Vinylon film coating was removed from the bottom of the one-ply photocurable prepreg sheet for waterproofing obtained in Example 3. The sheet was then laminated into one ply over the dried surface to which the primer was applied while being pressed lightly. The top surface remained coated with the Vinylon film. The sheet was then allowed to stand in direct sunlight for 10 minutes to be cured completely. Subsequently, the Vinylon film that had coated the cured surface was removed. Another ply was laminated over the cured sheet in the same manner, over which still another ply was laminated in the same manner after the second ply was permanently cured so as to obtain a sheet having three plies. The operation was easy and took only a short time, with only very subtle odor of styrene being generated during the installation work.

(Adhesion Test)

In order to inspect the adhesion of the photocurable prepreg sheet for waterproofing, an ADHESION TESTER elcometer was used to examine the adhesive strength and state caused by destruction in a bonded area of 4.9 cm$^2$. It was found that the concrete, which was the base material, was destroyed, and approximately 5 to 10 mm of the concrete was separated. Thus, it was confirmed that even when the sheet was laminated in such a manner that each ply was cured completely before another ply was laminated thereon, adhesion between the photocurable prepreg sheet and concrete as well as between FRP layers was confirmed to be excellent. It was also confirmed that the photocurable prepreg sheet for waterproofing is easy to install and is endowed with satisfactory properties. The results are shown in Table 5.

Comparative Example 5

Installation Test
(Application of a Primer)

A one-component urethane primer (trade name: UM-50P) was applied with a brush to the top surface (30 cm×30 cm) of a plate (30 cm×30 cm×6 cm) of concrete sidewalk. The surface became dry after the plate was allowed to stand for 1 hour at ambient temperature.
(FRP Lining)

The Vinylon film was removed from the photocurable prepreg sheet for waterproofing obtained in Comparative Example 3. The sheet was then laminated in one ply over the dried surface to which the primer was applied while being pressed firmly so as to seal the irregular surface of the prepreg sheet. The top surface remained coated with the Vinylon film. The sheet was then allowed to stand in direct sunlight for 10 minutes to be cured completely. The operation for laminating the prepreg sheet required great efforts for pressing it on the dried surface.
(Adhesion Test)

In order to inspect the adhesion of the photocurable prepreg sheet for waterproofing, an ADHESION TESTER elcometer was used to examine the adhesive strength and state caused by destruction in a bonded area of 4.9 cm$^2$. It was observed that the concrete, which was the base material, was destroyed, and that approximately 1 mm of the concrete was separated. In addition, adhesive failure between the primer and the FRP layer was observed in some portions. Accordingly, the thus-obtained prepreg sheet was found to be unsatisfactory with respect to ease of installation and adhesion. The results are shown in Table 5.

Comparative Example 6

Installation Test
(Application of a Primer)

The same operation as in Example 5 was performed.
(FRP Lining)

To 100 parts of FK-2000, there were added 1.0 part of Parmeck N which serves as room temperature curing catalysts and 0.5 parts of cobalt naphthenate (Co:6%). Three plies of a glass fiber #450 chopped strand mat were impregnated with the resultant resin by use of a hand lay-up method so that 1 ply came to have a glass content of 30 wt %. The resultant composition was allowed to stand for 24 hours at room temperature, to thereby set at room temperature. The operation took a long time to complete and generated significantly strong odor of styrene during the installation work.
(Adhesion Test)

In order to inspect the adhesion of the photocurable prepreg sheet for waterproofing, an ADHESION TESTER elcometer was used to examine the adhesive strength and state caused by destruction in a bonded area of 4.9 cm$^2$. It was found that the concrete, which was the base material, was destroyed, and approximately 5 to 10 mm of the concrete was separated. The results are shown in Table 5.

Example 7

Installation Test
(FRP Lining)

The Vinylon film coating was removed from the buffer layer, which was at the bottom of the photocurable prepreg sheet for waterproofing having a buffer layer obtained in Example 4. The sheet was then laminated in one ply, while being pressed lightly against the surface of concrete which had not been subjected to primer treatment (the top surface remained coated with the Vinylon film). The sheet was then allowed to stand outdoors under a cloudy sky for 30 minutes to be cured completely. Subsequently, the Vinylon film that had coated the cured surface was removed. The operation was easy and took only a short time, with only very subtle odor of styrene being generated during the installation work.
(Adhesion Test)

In order to inspect the adhesion of the photocurable prepreg sheet for waterproofing, an ADHESION TESTER elcometer was used to examine the adhesive strength and state caused by destruction in a bonded area of 4.9 cm$^2$. It was observed that the concrete, which was the base material, was destroyed, and that approximately 5 to 10 mm of the concrete was separated. Thus, adhesion between the photocurable prepreg sheet and concrete as well as between FRP layers was confirmed to be excellent. It was also confirmed that the photocurable prepreg sheet for waterproofing is easy to install and is endowed with satisfactory properties. The results are shown in Table 5.

Example 8

Waterproofing Installation Test on Roof Floor
(Preparation)

A flat concrete roof floor of 100 m$^2$ was surface-treated, and a tent was set up thereon to prevent direct exposure to sunlight.
(Application of a Primer)

A one-component urethane primer (trade name: UM-50P) was applied with a brush to the concrete roof floor in an amount of 0.2 kg/M$^2$ over a period of 15 minutes. The surface became dry after being allowed to stand for 1 hour at ambient temperature.
(Correction of Unevenness)

Unevenness was corrected by use of a vinyl ester-type putty, Ripoxy Putty FMW (product of Showa Highpolymer Co., Ltd.), which was caused to set at room temperature. Three hours after the application of the putty, the site of application hardened with their surface being tack-free.
(FRP Lining)

The Vinylon film was removed from the buffer layer, which was at the bottom of the photocurable prepreg sheet for waterproofing obtained in Example 4. The sheet was then laminated in such a way that one ply was overlapped by another ply in about 10 cm (Vinylon film was removed from the overlapped surfaces), while being pressed lightly against the surface of the concrete.

The above work was completed within 15 minutes, and the tent was half removed so as to make one half of the area to be sunlight-exposed and the other half of the area to be shaded. The sunlight-exposed portion took five minutes before being completely set, whereas the shaded portion took 20 minutes before being completely set. During the installation work, the odor of styrene was almost insensible when two minutes and 10 minutes had elapsed for the sunlight-exposed area and for the shaded area, respectively.
(Adhesion test)

In order to inspect the performance of the photocurable material for waterproofing, 30 minutes after the FRP layer was set, an ADHESION TESTER elcometer was used to examine the adhesive strength and state caused by destruction in a bonded area of 4.9 cm². It was observed that the concrete, which was the base material, was destroyed, and that approximately 5 to 10 mm of the concrete was separated. The adhesion strength was excellent and as high as 25 kgf/cm². Also, the installation method was confirmed to be an excellent one, with suppressed styrene odor.

TABLE 5

|  | Ex. 5 | Ex. 6 | Ex. 7 | Comp. Ex. 5 | Comp. Ex. 6 |
|---|---|---|---|---|---|
| Adhesion strength (kgf/cm²) | 31 | 38 | 28 | 10 | 32 |
| Breakage status[1] | C | C | C | C: 50% P/F: 50% | C |
| Thickness of the separated concrete | 5–10 mm | 5–10 mm | 5–10 mm | 1 mm | 5–10 mm |

[1]C: Breakage of base concrete material
P/F: Separation between the primer layer and the FRP layer.

The prepreg sheet of the present invention can be manufactured with ease in a short time, with the resin remaining stably in a prepregnate. Since the fibrous reinforcing material has been impregnated with a photocurable resin in advance, there is no need to impregnate the fibrous reinforcing material with resin at the work site. Moreover, adjustment of the pot life is not necessary. In addition, installation work is easy due to excellent smoothness of the prepreg sheet.

With regard to setting, only a short time is needed even at ambient temperature, and in this case, changes in resin composition attributed to vaporization of reactive monomers and environmental pollution due to offensive odor are remarkably suppressed, the after-set hardness is satisfactory even though setting requires only a short time, and adhesion is satisfactory with high adhesion strength and separation strength.

What is claimed is:

1. A photocurable prepreg sheet for waterproofing comprising:
   (1) a fiber-reinforced resin layer which comprises a sheet-shaped inorganic or organic fibrous reinforcing material impregnated with a resin composition comprising:
      100 parts by weight of (A) an unsaturated polyester resin, vinyl ester resin, or a mixture thereof, and
      0.01 to 10 parts by weight of (B) at least two photopolymerization initiators having photosensitivity in different wavelength ranges from ultraviolet range to near infrared range,
   and which is treated with light of a specific wavelength to thereby undergo prepolymerization which causes at least one of the photopolymerization initiators and radical-polymerizable unsaturated groups to remain partially intact; and
   (2) film which covers an upper surface and a back surface of the fiber-reinforced resin layer.

2. A photocurable prepreg sheet for waterproofing according to claim 1, wherein one of the photopolymerization initiators having photosensitivity from ultraviolet range to near infrared range comprises a combination of a cationic dye and a sensitizer; the cationic dye having photosensitivity from visible light range to near infrared range and being represented by formula (1):

$$D^+ \cdot A^- \quad (1)$$

wherein $D^+$ represents a dye cation having photosensitivity from visible light range to near infrared range and derived from methine, polymethine, xanthene, oxazine, thiazine, arylmethane, or pyrylium, and $A^-$ represents an anion; and the sensitizer being represented by formula (2):

(2)

wherein $Z^+$ represents an arbitrary cation; each of $R^1$, $R^2$, $R^3$, and $R^4$ independently represents an alkyl group, an aryl group, an aralkyl group, an alkenyl group, an alkynyl group, a silyl group, a heterocyclic group, or a halogen atom.

3. A photocurable prepreg sheet for waterproofing according to claim 1, wherein one of the polymerization initiators having photosensitivity from ultraviolet range to near infrared range is a combination of a hexaarylbiimidazole compound having photosensitivity from ultraviolet range to visible light range and a hydrogen-donating compound, or an acylphosphine oxide compound.

4. A photocurable prepreg sheet for waterproofing according to claim 1, wherein the sheet-shaped inorganic or organic fibrous reinforcing material is selected from the group consisting of a glass-made or organic-fiber-made mat, cloth, and non-woven fabric.

5. A photocurable prepreg sheet for waterproofing comprising:
   (1) a precured resin layer which comprises a resin composition of a predetermined thickness comprising:
      100 parts by weight of (A) an unsaturated polyester resin, vinyl ester resin, or a mixture thereof, and
      0.01 to 10 parts by weight of (B) at least two photopolymerization initiators having photosensitivity in different wavelength ranges from ultraviolet range to near infrared range,
      and which is treated with light of a specific wavelength so as to cause at least one of the photopolymerization initiators and radical-polymerizable unsaturated groups to remain partially intact;
   (2) a fiber-reinforced resin layer which comprises a sheet-shaped inorganic or organic fibrous reinforcing material impregnated with a resin composition comprising the aforementioned components (A) and (B), and which is treated with light of a specific wavelength to thereby undergo prepolymerization which causes at least one of the photopolymerization initiators and radical-polymerizable unsaturated groups to remain partially intact; and
   (3) film which covers an upper surface and a back surface of the fiber-reinforced resin layer and the resin layer.

6. A photocurable prepreg sheet for waterproofing according to claim 5, wherein one of the photopolymerization initiators having photosensitivity from ultraviolet range to near infrared range comprises a combination of a cationic dye and a sensitizer; the cationic dye having photosensitivity from visible light range to near infrared range and being represented by formula (1):

$$D^+ \cdot A^- \quad (1)$$

wherein D⁺ represents a dye cation having photosensitivity from visible light range to near infrared range and derived from methine, polymethine, xanthene, oxazine, thiazine, arylmethane, or pyrylium, and A⁻ represents an anion; and the sensitizer being represented by formula (2):

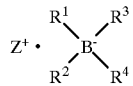
(2)

wherein Z⁺ represents an arbitrary cation; each of R¹, R², R³, and R⁴ independently represents an alkyl group, an aryl group, an aralkyl group, an alkenyl group, an alkynyl group, a silyl group, a heterocyclic group, or a halogen atom.

7. A photocurable prepreg sheet for waterproofing according to claim 5, wherein one of the polymerization initiators having photosensitivity from ultraviolet range to near infrared range is a combination of a hexaarylbiimidazole compound having photosensitivity from ultraviolet range to visible light range and a hydrogen-donating compound, or an acylphosphine oxide compound.

8. A photocurable prepreg sheet for waterproofing according to claim 5, wherein the sheet-shaped inorganic or organic fibrous reinforcing material is selected from the group consisting of a glass-made or organic-fiber-made mat, cloth, and non-woven fabric.

\* \* \* \* \*